United States Patent
Li et al.

(10) Patent No.: US 9,622,019 B2
(45) Date of Patent: Apr. 11, 2017

(54) SYSTEMS AND METHODS FOR GENERATING A VIRTUAL NETWORK TOPOLOGY FOR M2M COMMUNICATIONS

(71) Applicants: Xu Li, Nepean (CA); Hang Zhang, Nepean (CA)

(72) Inventors: Xu Li, Nepean (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 14/555,935

(22) Filed: Nov. 28, 2014

(65) Prior Publication Data
US 2016/0157043 A1    Jun. 2, 2016

(51) Int. Cl.
*H04L 12/28* (2006.01)
*H04W 4/00* (2009.01)
*H04L 12/24* (2006.01)
*H04L 12/931* (2013.01)

(52) U.S. Cl.
CPC ............. *H04W 4/005* (2013.01); *H04L 41/12* (2013.01); *H04L 49/70* (2013.01)

(58) Field of Classification Search
CPC .................................................. H04W 40/00
See application file for complete search history.

(56) References Cited

U.S. PATENT DOCUMENTS

| | | | |
|---|---|---|---|
| 2008/0205293 A1* | 8/2008 | Mitra | H04L 41/0806 370/254 |
| 2012/0287854 A1 | 11/2012 | Xie et al. | |
| 2013/0047151 A1 | 2/2013 | Sridharan et al. | |
| 2013/0121207 A1* | 5/2013 | Parker | H04L 67/10 370/254 |
| 2014/0307556 A1 | 10/2014 | Zhang | |
| 2014/0362730 A1* | 12/2014 | Zhang | H04W 40/246 370/254 |
| 2015/0124604 A1* | 5/2015 | Dao | H04W 28/0247 370/231 |

FOREIGN PATENT DOCUMENTS

| | | | |
|---|---|---|---|
| CN | 103733574 A | 4/2014 | |
| EP | WO2015176775 | * 5/2014 | ............. H04L 12/24 |
| WO | 2014098676 A1 | 6/2014 | |

OTHER PUBLICATIONS

PCT International Search Report, PCT/CN2015/094933, Feb. 14, 2016, 14 Pages.

* cited by examiner

*Primary Examiner* — Omar Ghowrwal
*Assistant Examiner* — Angel Brockman

(57) ABSTRACT

Methods and systems for generating a virtual network topology for machine-to-machine communications. A set of input information including network information and configuration information is obtained. One or more virtual serving gateways for the virtual network are located at one or more physical hosts, and each machine is associated with a respective virtual serving gateway, in accordance with the network information and the configuration information. A set of output information defining the virtual network topology is generated.

23 Claims, 7 Drawing Sheets

SYSTEMS AND METHODS FOR GENERATING A VIRTUAL NETWORK TOPOLOGY FOR M2M COMMUNICATIONS

FIELD

The present disclosure relates to machine-to-machine (M2M) communications in a network. In particular, the present disclosure relates to systems and methods for generating a virtual network topology for M2M communications.

BACKGROUND

Machine-to-machine (M2M) communications is a technology that realizes a network for collecting data from machines (e.g., sensors, smart meters, and/or other low-end devices) that are typically massively and densely deployed, and for transmitting events captured by those low-end devices to high-end applications. M2M networks may be wired or wireless and may have a relatively large geographical distribution (e.g., across a country or across the world). The high-end applications are typically responsible for translating the received raw machine data into meaningful information, for example to support decision making or automation. M2M communications typically do not involve direct human intervention and have exhibited a rapid increase in connection count.

M2M communications typically involve a large number of machines reporting to a small number of data destinations (also referred to as sinks). M2M data traffic may be characterized as low-rate, small-packet traffic. For example, a machine typically transmits at a low frequency (e.g., one transmission every few minutes or hours) and each transmission typically is a small amount of data (e.g., in the range of tens of bytes to hundreds of bytes). Machine traffic may arrive in batches, rather than as a more steady flow. Characteristics of M2M traffic present both challenges and opportunities for network traffic engineering.

SUMMARY

In some examples, the present disclosure provides methods for generating a virtual network topology for machine-to-machine communications. An example method may include obtaining a set of input information including: network information providing information about a physical network for machine-to-machine communications among a plurality of machines; and configuration information providing one or more parameters for configuring the virtual network topology. The example method may include locating one or more virtual serving gateways for the virtual network at one or more physical hosts in the physical network and associating each of the plurality of machines with one of the one or more virtual serving gateways, in accordance with the network information and the configuration information. The example method may further include generating a set of output information defining the virtual network topology. The output information may include: information identifying a location of the one or more virtual serving gateways at the one or more physical hosts; and information identifying associations between the plurality of machines and the one or more virtual serving gateways.

In some examples, the present disclosure provides methods for traffic engineering for machine-to-machine communications among a plurality of machines. An example method may include obtaining topology information defining a virtual network topology for a physical network, where the virtual network topology identifies locations of one or more virtual serving gateways at one or more physical hosts in the physical network and identifies associations of each of the plurality of machines with one of the one or more virtual serving gateways; segmenting the virtual network topology into individual flow segments; and performing traffic engineering on the flow segments and monitoring traffic quality in the physical network. When a trigger event is detected, a request for a new virtual network topology may be generated.

In some examples, the present disclosure provides systems for generating a virtual network topology for machine-to-machine communications. An example system may include a processing device configured to cause the system to obtain a set of input information including: network information providing information about a physical network for machine-to-machine communications among a plurality of machines; and configuration information providing one or more parameters for configuring the virtual network topology. The processing device may further be configured to cause the system to locate one or more virtual serving gateways for the virtual network at one or more physical hosts in the physical network and associate each of the plurality of machines with one of the one or more virtual serving gateways, in accordance with the network information and the configuration information. The processing device may further be configured to cause the system to generate a set of output information defining the virtual network topology. The output information may include: information identifying a location of the one or more virtual serving gateways at the one or more physical hosts; and information identifying associations between the plurality of machines and the one or more virtual serving gateways.

In some examples, the present disclosure provides systems for traffic engineering for machine-to-machine communications among a plurality of machines. An example system may include a processing device configured to cause the system to: obtain topology information defining a virtual network topology for a physical network, where the virtual network topology identifies locations of one or more virtual serving gateways at one or more physical hosts in the physical network and identifies associations of each of the plurality of machines with one of the one or more virtual serving gateways; segment the virtual network topology into individual flow segments; and perform traffic engineering on the flow segments and monitoring traffic quality in the physical network. When a trigger event is detected, the processing device may cause the system to generate a request for a new virtual network topology.

BRIEF DESCRIPTION OF THE DRAWINGS

Reference will now be made, by way of example, to the accompanying drawings which show example embodiments of the present disclosure, and in which.

Similar reference numerals may have been used in different figures to denote similar components.

DESCRIPTION OF EXAMPLE EMBODIMENTS

Software-defined networking (SDN) is an architectural framework for creating intelligent programmable networks, where network traffic management and network traffic forwarding are usually separated into the control plane and the data plane, respectively. In SDN, network control is usually centralized and the underlying network infrastructure is usually abstracted from the application.

A software-defined topology (SDT) may be formed, in accordance with the present disclosure for example, and the SDT may be used with SDN and software-defined protocol (SDP) to create a virtual network (VN). A VN may be a per-service network, meaning that the VN may be a collection of resources virtualized for a particular service. The SDT may be formed based on customer information and provider information. Customers may include users of one or more services (e.g., via a user equipment (UE), a terminal or other suitable user device). Providers may include service providers, VN operators, and/or other providers of services over the network. M2M communications over a VN may present challenges as well as opportunities for traffic engineering (TE).

A M2M session typically does not present as a thick flow of packets, but rather a series of single-packet or few-packet thin flows scattered over a period of time. Per session traffic splitting, which may be performed for TE optimization, typically does not apply to M2M traffic, since traffic splitting cannot be implemented on a single-packet flow. The presence of many such small-sized packet flows may result in poor resource utilization and a drop in system performance, using conventional TE. However, while individual machines typically have low transmission rates, the total M2M packet count present in the network is typically large as a result of massive machine deployment. As every packet occupies some network resources (e.g. processor cycle at routers, for packet header processing), it is typically more costly to convey data through small-size packets than large-size ones. A large number of small-size packets may thus cause degraded network resource utilization and system performance drop.

In accordance with examples of the present disclosure, traffic aggregation may help to mitigate the challenges outlined above. Traffic aggregation may benefit from characteristics of M2M network traffic, which typically exhibits content correlation and dense deployment, typically involves many machines transmitting data to a few traffic destinations, and is typically delay-tolerant. TE may then be performed on the aggregated traffic.

Figure 1:
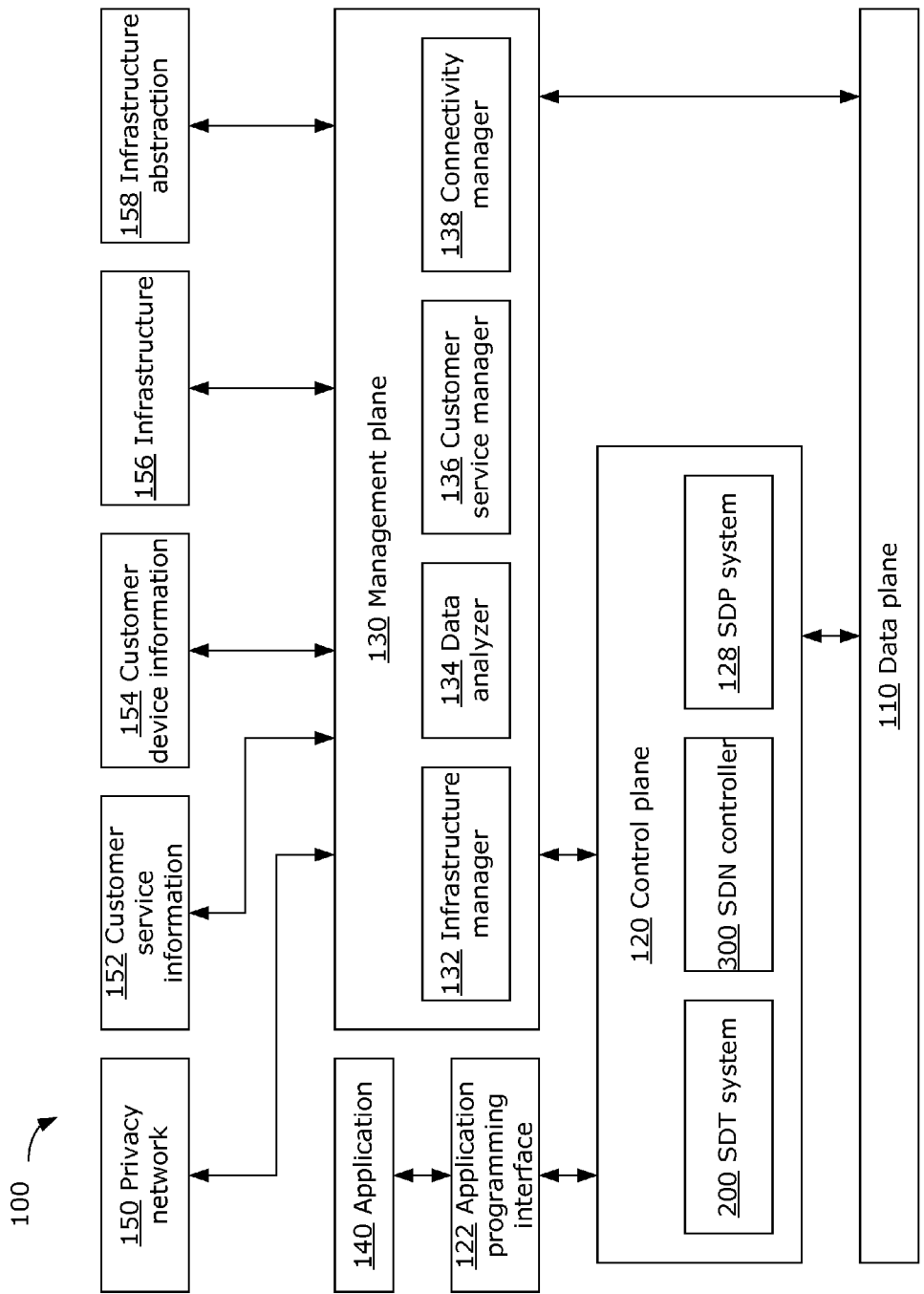
FIG. 1 is a schematic diagram of an example logical architecture for a network.

To assist in understanding the present disclosure, reference is first made to FIG. 1, showing an example logical architecture 100 for a network which may be used for M2M communications. The example architecture 100 may be used to implement SDN, using a SDT. The SDT may be used in SDN to facilitate traffic control and/or traffic processing, by defining virtual serving gateways via which M2M communications are routed and by defining a virtual topology, as discussed further below.

Generally, a SDT may provide a framework for software-defined content delivery that may allow operators to define on-demand and service specific data plane architecture (also referred to as network topology or logical topology) to help enable more efficient use of network resources and/or help ensure quality of experience (QoE) and/or quality of service (QoS) to users. The SDT may, for each application, service or per-service VN, define an on-demand and customized data plane topology. The SDT may define the physical locations of logical network nodes for the logical data plane, as well as the topology of the logical nodes. Service-specific data processing functionalities for the logical nodes may also be defined in the SDT.

Generally, a logical node may be a software-defined entity implemented at a physical network node (also referred to as the physical host for the logical node), may perform various functions and may take on various roles within the network. For example, a logical node may be a service-specific virtual serving gateway (v-s-SGW), a user-specific virtual serving gateway (v-u-SGW), or a content container, among other possible roles.

The SDT typically determines the data plane logical topology for each application, service or per-service VN, based on requirements such as QoE and/or QoS. The SDT may also determine the data plane logical topology according to the service level logical topology, service function chain requirements, service traffic characteristics, customer distribution, and/or traffic load predictions, among other parameters. The SDT may be adaptive to feedback from the SDN controller, as discussed further below, to enable adaptation to changes in traffic load, network node capabilities, and/or changes in the physical network, for example. The SDT may be managed by network providers, VN providers or other operators.

FIG. 1 shows the example network architecture 100 separating an example network (e.g., a M2M network) into a data plane 110, a control plane 120 and a management plane 130. The data plane 110 may transport network traffic among various network nodes (e.g., machines to access points, access points to routers, and access points/routers to servers). The control plane 120 may perform TE and may transport control signals among the various network nodes. The management plane 130 may provide management and administrative functionalities for the network. The data plane 110, the control plane 120 and the management plane 130 may interface with each other, to enable the functionalities of each plane.

The control plane 120 may provide an application programming interface (API) 122 to allow one or more applications 140 to access the control plane 120. The control plane 120 may host various control blocks, such as a SDT system 200, a SDN controller 300, and a SDP system 128, to carry out the functionalities of the control plane 120. The SDT system 200, SDN controller 300 and SDP system 128 may be implemented in one or more shared or separate processing systems.

The management plane 130 may host various control blocks (e.g., software modules) to carry out its functionalities. For example, the management plane 130 may implement an infrastructure manager 132, a data analyzer 134, a customer service manager 136 and/or a connectivity manager 138. Other functionalities may be provided by the management plane 130, such as content service management, which may define content caches in a radio access network (RAN), configure cache-capable network nodes, and manage content forwarding.

The management plane 130 may access one or more databases, which may be included in the architecture 100, to carry out its functionalities. Example databases include a privacy network database 150, a customer service information database 152, a customer device information database 154, an infrastructure database 156 and an infrastructure abstraction database 158. The privacy network database 150 may store topology information, security information, information about node capabilities and/or information about node states. The customer service information database 152 may store authentication and security information related to customer devices (e.g., UEs). The customer device information database 154 may store information about capabilities, locations and/or states of customer devices. The infrastructure database 156 may store information about network topology, node capabilities and/or node states. The infrastructure abstraction database 158 may store information about various infrastructure abstractions within the network. There may be more or less databases than those described in this example, and one or more of these example databases may be combined as a single database.

Figure 2:
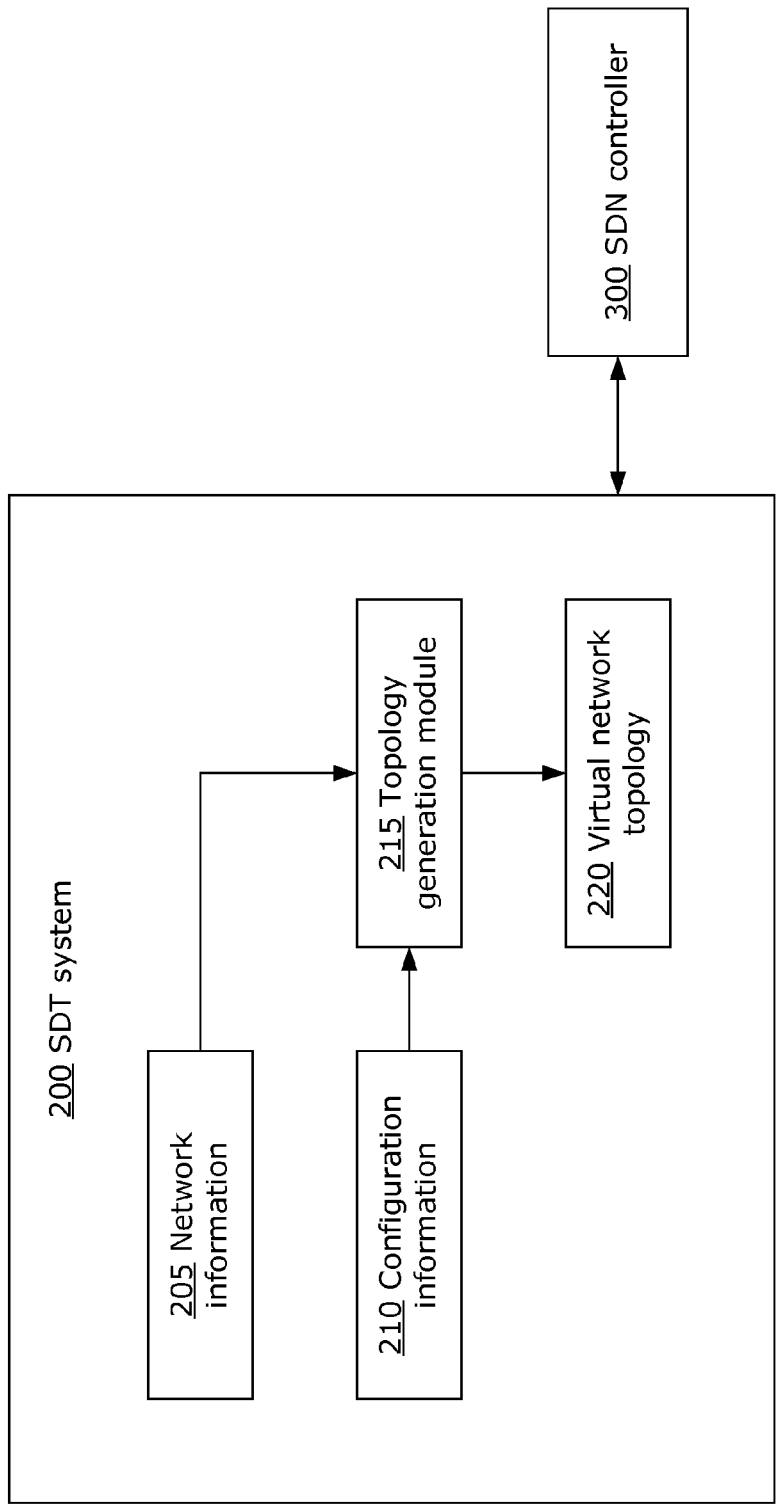
FIG. 2 is a schematic diagram of an example software-defined topology system, in communication with a software-defined networking controller.

FIG. 2 is a schematic diagram of an example system for generating a logical topology for M2M communications over a VN. The system may be the SDT system 200. The SDT system 200 may generally be responsible for customizing the logical data plane topology for the VN. In the present disclosure, the logical data plane topology for the VN will be generally referred to as the VN topology. The SDT system 200 may communicate with one or more network control components, such as the SDN controller 300. The SDT system 200 may cooperate with the SDN controller 300 to facilitate traffic control and processing, including generating the VN topology and providing information about the VN topology to the SDN controller 300, for example as disclosed herein.

The SDT system 200 may store information used to generate a VN topology. In the example shown, the SDT system 200 stores network information and configuration information in respective network information database 205 and configuration information database 210. This information may be stored in a memory of the SDT system 200, for example, as discussed further below with respect to FIG. 4. The network information database 205 may include information about the physical network (e.g., machine locations, machine traffic, network node properties, and/or virtual serving gateway candidates), discussed further below. The configuration information database 210 may include parameters used for configuring a VN topology, such as cost measures and scope of interest, as discussed further below. The network information and the configuration information may be received as input from one or more external sources (e.g., from the SDN controller 300 or from an operator). In some examples, the network information and/or the configuration information may not be stored by the SDT system 200, but may instead be received or retrieved from an external source (e.g., one or more external databases) and may be discarded after use, in which case the network information database 205 and/or the configuration information database 210 may be omitted from the SDT system 200.

A topology generation module 215 may obtain network information and configuration information (e.g., from the network information database 205 and the configuration information database 210, or from an external source such as the SDN controller 300) as input to generate a VN topology. The topology generation module 215 may generate a VN topology using an optimization process, such as in the examples described below. Although the term "optimization" is used, it should be understood that this refers to a process in which a VN topology is generated to meet certain criteria (e.g., as specified in the configuration information), and may not be strictly "optimal". For example, there may be trade-offs and/or estimation involved, and some criteria may be prioritized over other criteria (e.g., based on selection by an operator).

The topology generation module 215 may output information about the generated VN topology, which information may be stored in a VN topology database 220 in a memory of the SDT system 200. The VN topology information may include, for example, selection of physical hosts for virtual serving gateways, association of machines to virtual serving gateways and network hierarchy (in examples where a hierarchical topology is used). The SDT system 200 may provide the VN topology information to the SDN controller 300, through wired or wireless communication. In some examples, the VN topology information may be stored external to the SDT system 200 (e.g., by the SDN controller 300 or in another external database), in which case the VN topology database 220 may be omitted from the SDT system 200. In some examples, only information about the current VN topology is stored. In other examples, information about one or more historical VN topologies may be stored (e.g., in an external historical database).

In some examples, the SDT system 200 may also determine one or more functionalities to be provided by one or more virtual serving gateways (e.g., where there are no service restrictions at the physical host(s) of the virtual serving gateway(s)). This determination may be carried out by the topology generation module 215. The SDT system 200 may provide output information that defines functionality(ies) for specific virtual serving gateway(s) at specific physical host(s) to the SDP system 128. The SDP system 128 may then interact with hardware in the data plane 110 to install or otherwise enable the defined functionality(ies) at the specified physical host(s). This may enable customizable or application-defined virtual serving gateway functionalities.

The SDT system 200 may be physically hosted by one or more servers of the control plane 120. The SDT system 200 may generate VN topologies for multiple overlapping or non-overlapping M2M networks, and for different M2M services.

Figure 3:
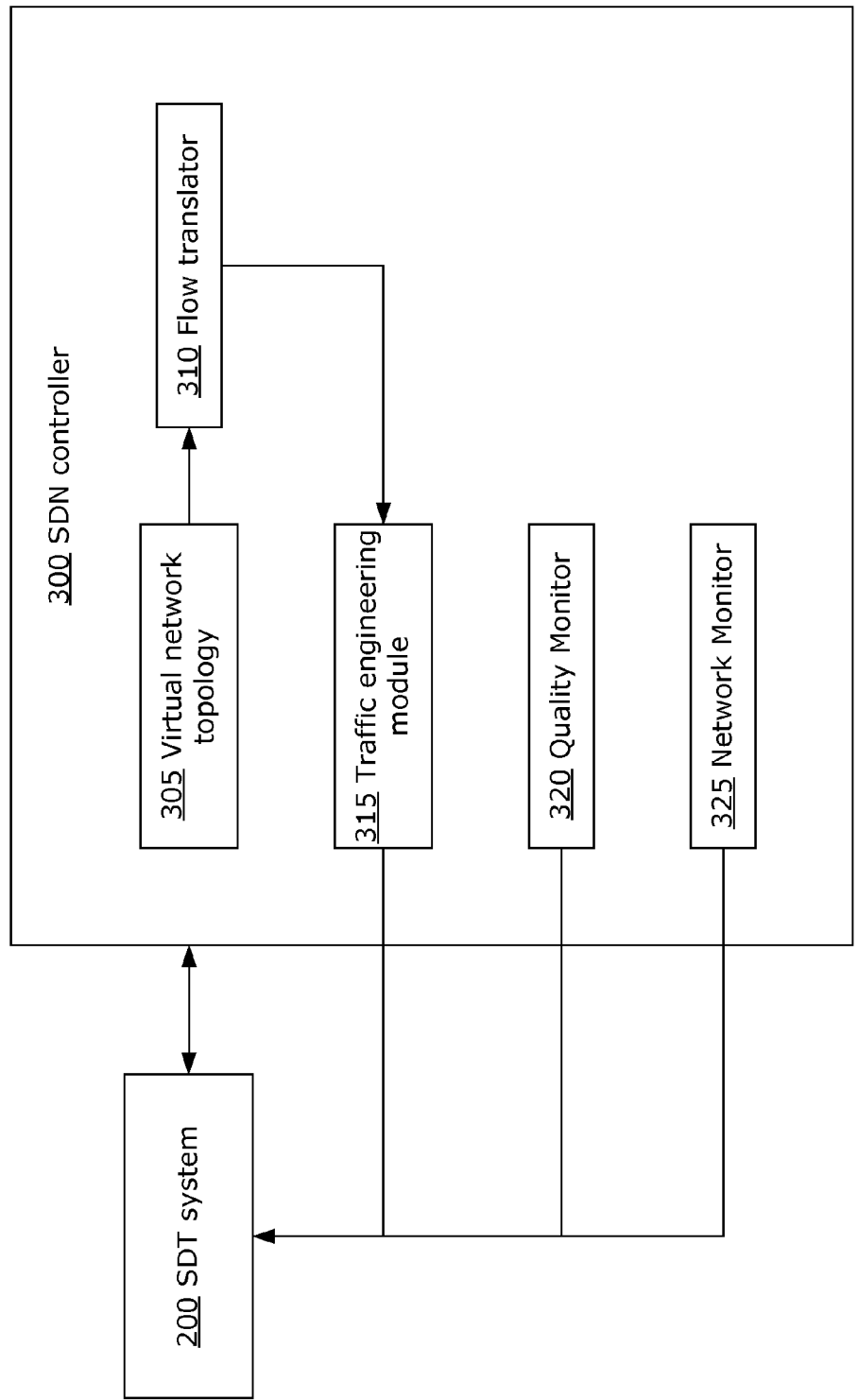
FIG. 3 is a schematic diagram of an example software-defined networking controller, in communication with a software-defined topology system.

FIG. 3 is a schematic diagram of an example SDN controller 300. The SDN controller 300 may generally be responsible for customized resource allocation. The SDN controller 300 may cooperate with the SDT system 200 to facilitate traffic control and processing. For example, the SDN controller 300 may provide feedback to the SDT system 200, such as requests to update or change the VN topology.

The SDN controller 300 may receive information from the SDT system 200 defining a VN topology, and may store the VN topology information in a VN topology database 305 in a memory of the SDN controller 300. The VN topology information may be provided to a flow translator 310, which may translate the VN topology into individual flow segments for the purpose of TE. For example, a path through several levels of a hierarchical topology may be translated by the flow translator 310 into individual flow segments corresponding to each level. The flow segments from the flow translator 310 may be provided to a TE module 315 for traffic management. In this way, the TE module 315 may not need to have any information about the actual VN topology.

The TE module 315 may perform traffic management according to various suitable TE techniques. The SDN controller 300 may implement a quality monitor 320 which may monitor the network traffic for QoE and/or QoS. The SDN controller 300 may also implement a network monitor 325 which may monitor the network for network events, such as a significant change in the data plane topology (e.g., addition/removal of a significant number of machines, addition/removal of a physical node, change in physical connectivity between network nodes), a significant change in the machine or network traffic flow, or other such network events.

The SDN controller 300 may provide feedback to the SDT system 200. For example, the SDN controller 300 may, through the TE module 315, the quality monitor 320 and/or the network monitor 325, request the SDT system 200 to update, change or otherwise generate a new VN topology. For example, the SDN controller 300 may request a new topology from the SDT system 200 when a significant change in the physical network is detected (e.g., as detected by the network monitor 325), when a significant change in traffic flow is detected (e.g., as detected by the network monitor 325), or when QoE and/or QoS falls below a certain threshold (e.g., as detected by the quality monitor 320).

Figure 4:
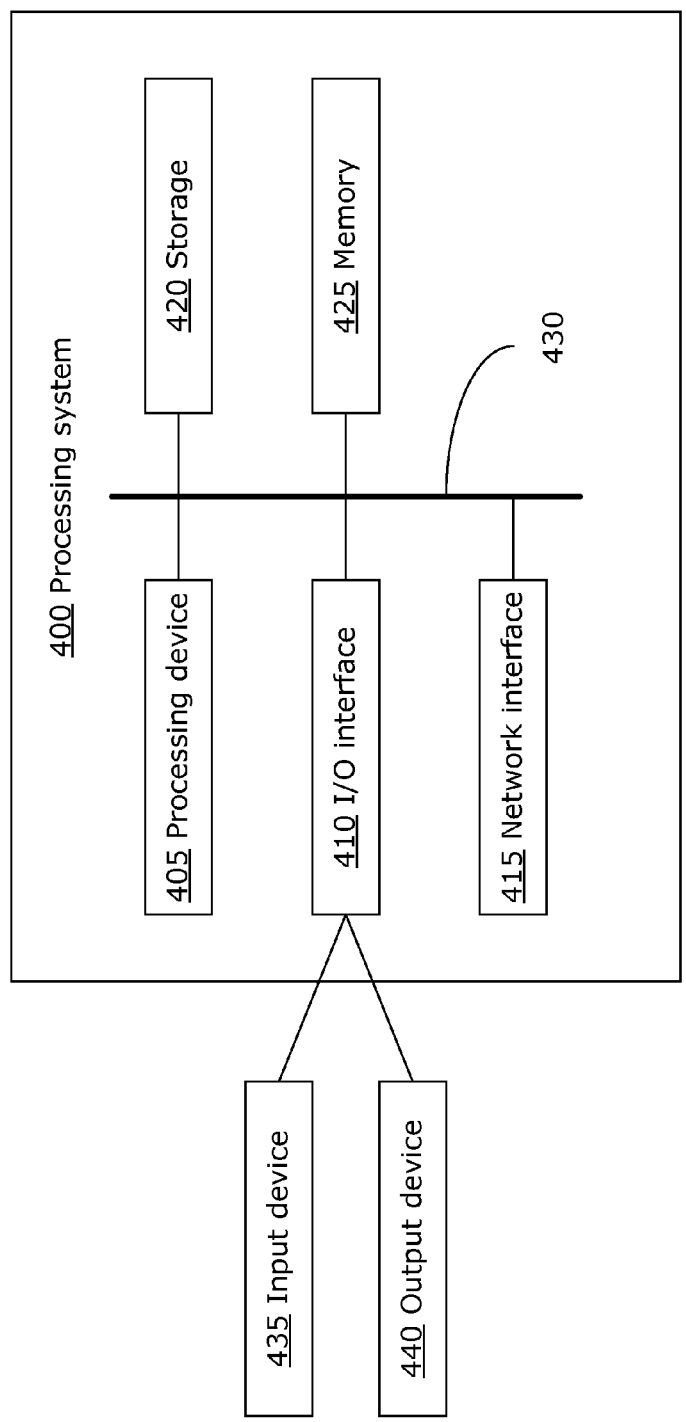
FIG. 4 is a schematic diagram of an example processing system suitable for implementing the present disclosure.

FIG. 4 is a schematic diagram of an example processing system 400, which may be used to implement the methods and systems disclosed herein, such as the example SDT system 200, the example SDN controller 300, and the example methods described below. The SDT system 200 and the SDN controller 300 may be implemented on shared or separate processing systems 400. In some examples, the SDT system 200 and/or the SDN controller 300 may be implemented by a plurality of processing systems 400 working in parallel. The processing system 400 may be a server, for example, or any suitable processing system. Other processing systems suitable for implementing the present disclosure may be used, which may include components different from those discussed below. Although FIG. 4 shows a single instance of each component, there may be multiple instances of each component in the processing system 400.

The processing system 400 may include one or more processing devices 405, such as a processor, a microprocessor, an application-specific integrated circuit (ASIC), a field-programmable gate array (FPGA), a dedicated logic circuitry, or combinations thereof. The processing system 400 may also include one or more input/output (I/O) interfaces 410, which may enable interfacing with one or more appropriate input devices 435 and/or output devices 440. The processing system 400 may include one or more network interfaces 415 for wired or wireless communication with a network (e.g., an intranet, the Internet, a P2P network, a WAN and/or a LAN). The network interface(s) 415 may include wired links (e.g., Ethernet cable) and/or wireless links for intra-network and/or inter-network communications. The network interface(s) 415 may provide wireless communication via one or more transmitters or transmit antennas and one or more receivers or receive antennas, for example. The processing system 400 may also include one or more storage units 420, which may include a mass storage unit such as a solid state drive, a hard disk drive, a magnetic disk drive and/or an optical disk drive.

The processing system 400 may include one or more memories 425, which may include a volatile or non-volatile memory (e.g., a flash memory, a random access memory (RAM), and/or a read-only memory (ROM)). The non-transitory memory(ies) 425 may store instructions for execution by the processing device(s) 405, to carry out the functions of the SDT system 200 and/or the SDN controller 300. Depending on whether the processing system 400 implements the SDT system 200 or the SDN controller 300 or both, the memory(ies) 425 may have tangibly stored thereon data and module(s) for implementing the functions of the SDT system 200 or the SDN controller 300 or both, as appropriate. For example, the memory(ies) 425 may include the network information database 205, the configuration information database 210, and/or the VN topology database 220, and modules such as the topology generation module 215, as described above with respect to the example SDT system 200 of FIG. 2. The memory(ies) 425 may additionally or alternatively include the VN topology database 305, and modules such as the flow translator 310, TE module 315, quality monitor 320 and/or network monitor 325, as described above with respect to the example SDN controller 300 of FIG. 3. The memory(ies) 425 may include other software instructions, such as for implementing an operating system and other applications/functions. In some examples, one or more data sets and/or module(s) may be provided by an external memory (e.g., an external drive in wired or wireless communication with the processing system 400) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 430 providing communication among components of the processing system 400, including the processing device(s) 405, I/O interface(s) 410, network interface(s) 415, storage unit(s) 420 and/or memory(ies) 425. The bus 430 may be any suitable bus architecture including, for example, a memory bus, a peripheral bus or a video bus.

In FIG. 4, the input device(s) 435 (e.g., a keyboard, a mouse, a microphone, a touchscreen, and/or a keypad) and output device(s) 440 (e.g., a display, a speaker and/or a printer) are shown as external to the processing system 400. In other examples, one or more of the input device(s) 435 and/or the output device(s) 440 may be included as a component of the processing system 400.

Figure 5:
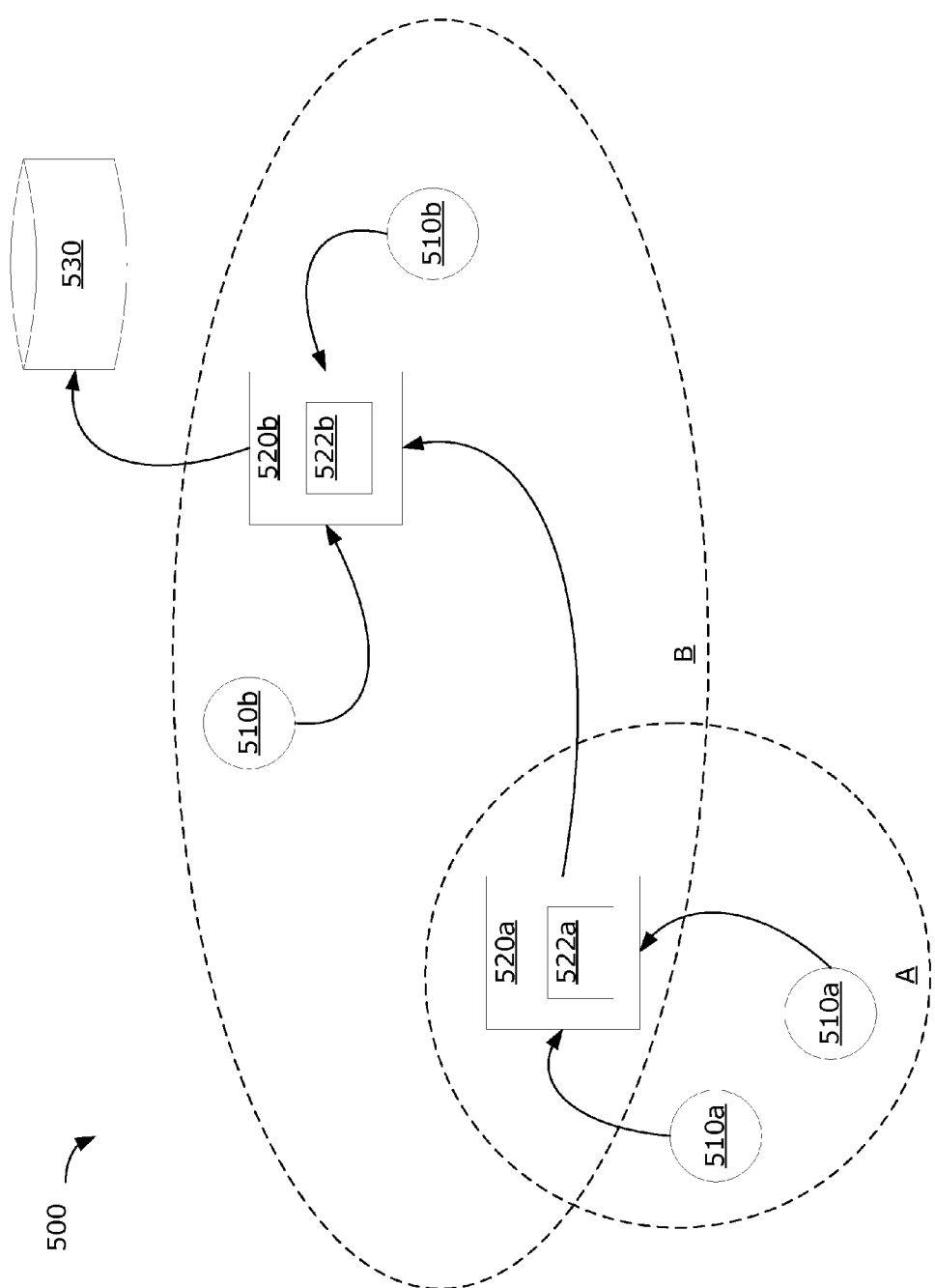
FIG. 5 is a schematic diagram of an example virtual network topology for M2M communications.

FIG. 5 is a schematic diagram of an example VN topology suitable for M2M communications, which may be implemented using the network architecture 100. In this example, the VN topology 500 includes a plurality of machines 510a, 510b, one or more virtual serving gateways 520a, 520b, and one or more sinks 530 (e.g., a destination server). Communications may include wired communications (e.g., from a machine 510a, 510b to a connected wireline access point or router) and/or wireless communications (e.g., from a machine 510a, 510b to a wireless access point or router, from one virtual serving gateway 520a to another virtual serving gateway 520b, and/or from a virtual serving gateway 520a, 520b to a sink 530). Wireless communications may take place over any suitable network (e.g., an intranet, the Internet, a peer-to-peer (P2P) network, a wide area network (WAN), and/or a local area network (LAN)), and may include short-range communications such as Bluetooth communications, near field communications, cellular communications, and/or radiofrequency (RF) communications.

A machine 510a, 510b may be a physical machine or a virtual machine, and may be a service within a device. In some examples, an access point, base station or router may act in the role of a machine 510a, 510b (e.g., as a virtual machine). Multiple physical machines may be represented in the VN topology 500 as a single machine 510*a*, 510*b* (e.g., a single virtual machine) by a proxy.

In the VN topology 500, each machine 510*a*, 510*b* is associated with one virtual serving gateway 520*a*, 520*b* by a logical path in the topology 500. The topology 500 defines a logical path directly from the machine 510*a*, 510*b* to its respective associated virtual serving gateway 520*a*, 520*b*, however this direct logical path may be implemented by data transmission via one or more access points and/or routers (not shown). In some examples, access points and/or routers may be incorporated into the VN topology 500 by treating the access points and/or routers as a machine 510*a*, 510*b*.

Generally, one or more machines 510*a* within a first grouping A is associated with a first virtual serving gateway 520*a* and transmits data to the first virtual serving gateway 520*a*, while one or more machines 510*b* within a second grouping B is associated with a second virtual serving gateway 520*b* and transmits data to the second virtual serving gateway 520*b*. Although FIG. 5 illustrates grouping A and grouping B as corresponding to the respective geographical locations of the machines 510*a*, 510*b* and virtual serving gateways 520*a*, 520*b*, in some examples groupings may be based on other factors, such as required traffic processing services, traffic density, or traffic content correlation, for example.

Traffic in the VN topology 500 may be considered to involve two phases, namely the machine-to-gateway phase and the gateway-to-sink phase. In machine-to-gateway traffic, data packets are transmitted from a machine 510*a*, 510*b* to its respective associated virtual serving gateway 520*a*, 520*b*. In gateway-to-sink traffic, the data packets are aggregated at the virtual serving gateway 520*a*, 520*b* and forwarded as a thick flow to the sink 530. Generally, TE may be performed separately on each phase of the traffic, and may be performed only on one phase or both phases of the traffic.

The virtual serving gateway 520*a*, 520*b* is a logical network node in the VN topology 500. In a per-service VN, the virtual serving gateway 520*a*, 520*b* is typically a v-s-SGW, which may provide traffic processing functionalities such as message aggregation, information extraction and transmission, reaction based on information extraction to control a controlled entity of the service, and message authentication, among others. These functionalities may be defined by service customers and/or network operators, for example. A virtual serving gateway 520*a*, 520*b* may be embodied in a physical host, such as a server, and two or more virtual serving gateways 520*a*, 520*b* may be embodied in the same physical host.

In some examples, such as in a hierarchical VN topology discussed further below, a first virtual serving gateway 520*a* may be served by a second virtual serving gateway 520*b*. In such a scenario, the second virtual serving gateway 520*b* may consider the first virtual serving gateway 520*a* to be a traffic source equivalent to a machine 510*b*. The functionality(ies) provided by each virtual serving gateway 520*a*, 520*b* may differ for different virtual serving gateways 520, 520*b*. For example, the first virtual serving gateway 520*a* may provide a first set of one or more functionalities 522*a* (e.g., implemented by one or more suitable applications hosted on the server embodying the first virtual serving gateway 520*a*), while the second virtual serving gateway 520*b* may provide a second set of one or more functionalities 522*b* (e.g., implemented by one or more suitable applications hosted on the server embodying the second virtual serving gateway 520*b*). The first set of functionalities 522*a* may overlap with the second set of functionalities 522*b* (that is, there may be one or more functionalities in common), or may be completely different.

Where different virtual serving gateways 520*a*, 520*b* provide different functionalities 522*a*, 522*b*, traffic may be routed according to the traffic processing desired. For example, data from a machine 510*a* may be first routed to a first virtual serving gateway 520*a* to apply a first process 522*a* provided by the first virtual serving gateway 520*a*. After processing by the first virtual serving gateway 520*a*, the data may be further routed to a second virtual serving gateway 520*b* to apply a second process 522*b* provided by the second virtual serving gateway 520*b* and not available at the first virtual serving gateway 520*a*. The further processed data may be further routed to a third virtual serving gateway (not shown) and so forth, until all required traffic processing has been carried out. The processed data may then be forwarded to the sink 530. In such examples, the VN topology 500 may be hierarchical, with a hierarchy built based on the functionalities 522*a*, 522*b* available at each virtual serving gateway 520*a*, 520*b*.

In some examples, the functionality(ies) 522*a*, 522*b* provided by one or more virtual serving gateways 520*a*, 520*b* may be defined and changed according to service and/or customer requirements. For example, the SDT system 200 may define the functionality(ies) 522*a*, 522*b* provided by the virtual serving gateway(s) 520*a*, 520*b*, and may output this information to the SDP system 128 to install or otherwise enable the defined functionality(ies) 522*a*, 522*b* at the physical host(s) of the virtual serving gateway(s) 520*a*, 520*b*.

The VN topology 500 may be generated by the SDT system 200 using the example methods disclosed herein. Generally, the VN topology 500 may be designed for more efficient and more effective use of shared network resources. For example, the VN topology 500 may be designed to route machine-to-gateway traffic using a single-path routing technique, and to route gateway-to-sink traffic using optimization of shared network resources. For example, for a given machine, selection of a virtual serving gateway that has a shorter path to the sink but a longer path from the machine may result in less efficient use of network resources due to unoptimized machine-to-gateway traffic. On the other hand, selection of a virtual serving gateway that has a shorter path from the machine but a longer path to the sink may also be less efficient since the virtual serving gateway may not be able to gather sufficient packets from a sufficient number of machines to form thick flows in gateway-to-sink traffic. Generally, it may be more efficient to have a lesser number of virtual serving gateways, in order to control operating costs; and to gather traffic with correlated content at the same virtual serving gateway as much as possible, in order to increase traffic aggregation (and hence content compression) potential.

Figure 6:
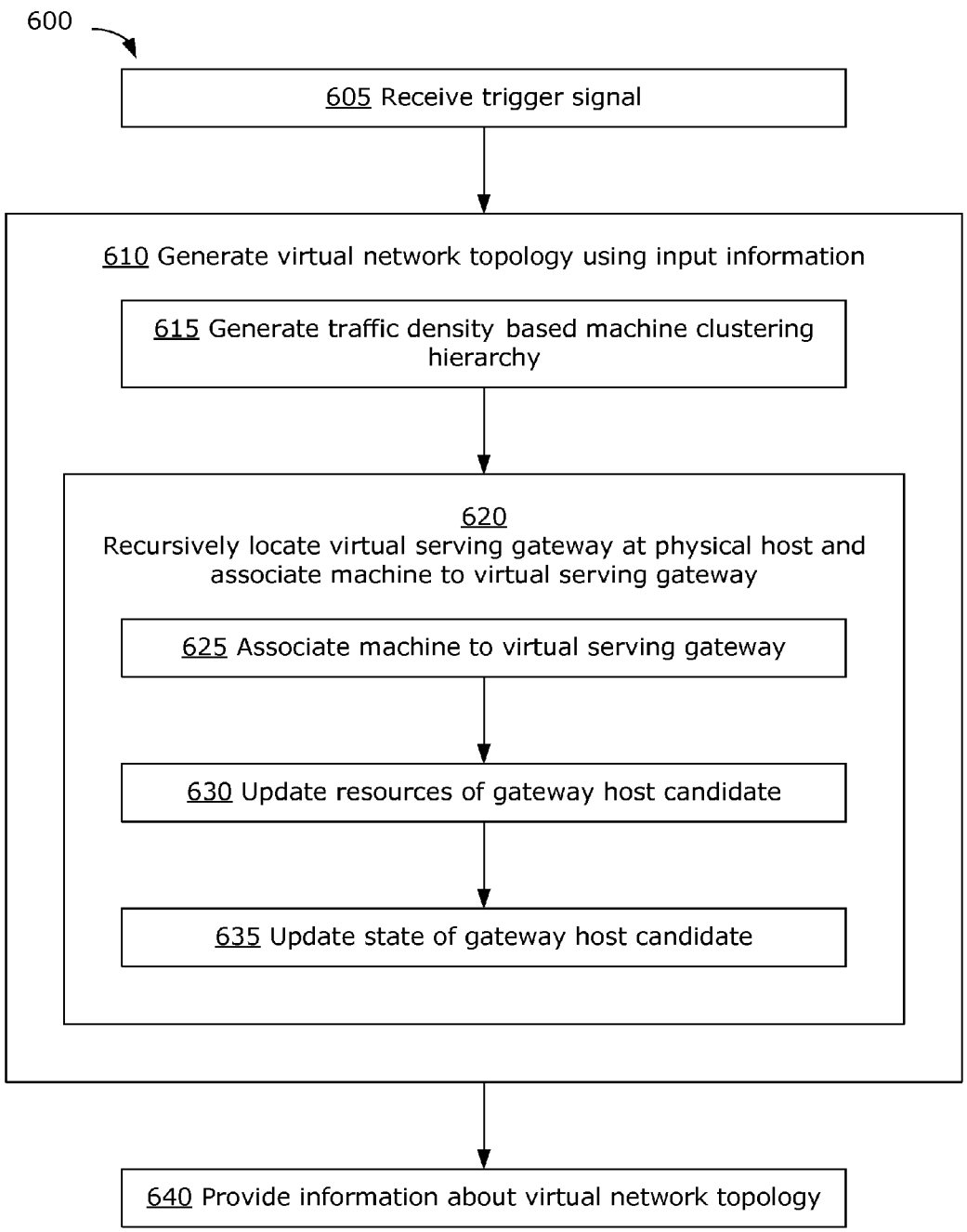
FIG. 6 is a flowchart illustrating an example method for generating a virtual network topology for M2M communications.

FIG. 6 is a flowchart of an example method for generating a VN topology for M2M communications. The example method 600 may be implemented by the SDT system 200, using one or more suitable processing systems 400.

At 605, a trigger signal is received, indicating that a new VN topology should be generated. The trigger may be, for example, a timeout event (e.g., where the SDT system 200 implements a timer to trigger an update of the VN topology at set times, such as every hour) and/or may be a signal transmitted to the SDT system 200 from the SDN controller 300. For example, the SDN controller 300 may transmit a signal to the SDT system 200 requesting a new VN topology:

in the event of QoS and/or QoE falling below a predetermined quality threshold;

in the event of a significant change to the network (e.g., change in machine traffic or background network traffic beyond a certain threshold, change in traffic correlation beyond a certain threshold, change in machine distribution, addition/removal of machine(s) and/or gateway candidate(s), change in physical connectivity between network nodes including addition/removal of a physical link and/or increase/decrease in the capacity of a physical link);

in the event of gateway overloading (e.g., number of machines associated with a given gateway exceeds a certain threshold, gateway traffic above a certain threshold, resource usage beyond a certain threshold); and/or in the event of network performance degradation (e.g., traffic congestion).

Where the trigger signal originates from the SDN controller 300, the trigger signal may be generated by or in response to conditions detected by the traffic engineering module 315, the quality monitor 320 and/or the network monitor 325.

At 610, input information is obtained and a new VN topology is generated. The SDT system 200 may generate the virtual network topology based on a set of input information including, for example, network information and configuration information.

Network information may include, among others:

machine location information;

machine traffic information (which may be instantaneous and/or statistical in nature), such as transmission schedule, transmission rate (e.g., mean, variance), transmission rate measurement series, and/or transmission rate correlation;

network traffic information (which may be instantaneous and/or statistical in nature);

physical network topology information, such as identification of physical nodes, node properties (e.g., location, available/maximum storage space), identification of physical links, link properties (e.g., available/maximum capacity, buffer size), identification of physical connections of traffic sources to the network, and/or connection properties (e.g. throughput, delay); and/or control plane information, such as identification of connectivity between pairs of data plane hardware, and associated properties (e.g., statistical throughput, operational cost, delay), identification of gateway host candidates, and/or gateway host candidate properties (e.g., upper/lower traffic load bounds, maximum/minimum machine count if used, permitted hierarchy levels, traffic processing functions, rate reduction/inflation factor).

Configuration information may include, among others:

information about network scope (e.g., geographic area of interest, machine set of interest, traffic density of interest);

definition of machine-to-gateway association cost measure (e.g., hop count, physical distance, operation cost);

permissible height of hierarchy;

customer/service information (e.g., customer/service identifier, service requirements such as service-function chaining requirements), which may be specified by the customer, service provider and/or VN provider as part of service requirements;

whether to engage in content compression at virtual serving gateways;

throughput requirements; and/or delay requirements.

The present disclosure may use the terms network information and configuration information generally to refer to the input information used to configure a VN topology. However, it should be understood that these are not strict categorical definitions and other types of input information may be included. For example, some of the input information may also be referred to as customer information or service information.

This input information may be obtained from databases internal to the SDT system 200 (e.g., the network information database 205 and/or configuration information database 210), databases external to the SDT system 200, the SDN controller 300 and/or an operator. In some examples, such as where the trigger signal is received from the SDN controller 300, at least a portion of the input information may be included with the trigger signal.

In the example of FIG. 6, an example recursive process is used for generating the VN topology. Other recursive or non-recursive process for generating the VN topology may be suitable. The example recursive process shown in FIG. 6 involves locating one or more virtual serving gateways at respective physical hosts, and associating machines with respective virtual serving gateway(s). Where a hierarchical topology is permitted (e.g., in accordance with the inputted configuration information), lower level virtual serving gateway(s) is(are) also associated with virtual serving gateway(s) of an adjacent higher level. Generation of the VN topology may be formulated as an optimization problem, examples of which are discussed further below, which aims to optimize one or more objectives (e.g., defined in accordance with the configuration information) based on network properties (e.g., determined from the network information). A traffic-density based recursive optimization process, as discussed below, may be used to solve this optimization problem.

In an example recursive optimization process, the optimization problem to be solved for generating the VN topology is approached using a clustering hierarchy. The optimization problem is solved for small clusters of machines first, then proceeding gradually to the entire network. The use of a clustering hierarchy may enable a divide-and-conquer approach to generate the VN topology for a large number of machines. Although described as being an approach suitable for addressing a relatively large number of machines (e.g., several thousand or more) in the network, this approach may also be suitable for networks with a smaller number of machines (e.g., less than a few thousand or less).

In some examples, this approach may also be suitable for generating a VN topology only for a portion of the network. For example, an update or change to the VN topology may be required only for a local region of the network experiencing a significant local change in the physical topology, a significant local change in the network traffic, or a significant drop in the QoE and/or QoS (e.g., as indicated by the input information). In such a situation, the cluster(s) relevant to that local region may be identified and a new VN topology may only be generated for the cluster(s) relevant to that local region, rather than for the entire network, since the VN topology for the rest of the network would be expected to remain unchanged. This may reduce the processing power required to accommodate local changes, which may result in faster and/or more economical adaptation of the VN topology.

In other examples, a non-recursive approach may be suitable (e.g., for a relatively sparse network or for a network with a relatively small number of machines).

At 615, a traffic density-based machine clustering hierarchy is generated. This clustering hierarchy divides machines in the network into clusters, according to traffic density, using any suitable clustering technique. Traffic density of a particular spatial region refers to the total traffic originating from within that spatial region. The clustering hierarchy may be generated based on information about machine location and machine traffic (e.g., mean traffic, traffic variance, traffic correlation) provided in the network information. The generated clustering hierarchy generally increases in traffic density from the top down. In other examples, other bases for generating a clustering hierarchy may be used in place of traffic density.

At 620, a recursive process is used to place virtual serving gateway(s) at respective physical gateway host candidate(s), and to associate each machine to respective virtual serving gateway(s), for example according to 625 to 635 described below. The clustering hierarchy is recursively traversed from the bottom (greater traffic density) to the top (lesser traffic density) or in the reverse order, depending on configuration.

A gateway host candidate may be any physical network node (e.g., a server) available in the physical network for hosting a virtual serving gateway. In an extreme case, all network nodes in the network may be candidates. In the other extreme, there may be only one host candidate in the network. The gateway host candidates and their properties (e.g., including the services provided by each gateway host candidate) may be provided in the network information at 610. Using the clustering hierarchy may help to ensure that machines are associated with a virtual serving gateway within a certain geographical range.

At 625, a machine is associated with a virtual serving gateway at a physical host. This association may be performed by matching the resource requirements of the machine (e.g., requested bandwidth and/or requested services) with the resources of a gateway host candidate (e.g., available bandwidth and/or services provided at the gateway host candidate where a virtual serving gateway is to be located), within the constraints defined in accordance with the configuration information (e.g., minimization of certain cost measures). In this example, and in the example optimization approaches discussed further below, associating a machine with a virtual serving gateway and locating a virtual serving gateway at a physical host are performed jointly. In other examples, associating a machine with a virtual serving gateway and locating a virtual serving gateway at a physical host may be performed separately (e.g., using two separate optimization calculations).

In examples where there is freedom to define the functionality(ies) provided by virtual serving gateway(s), the method 600 may include determining one or more functionalities that should be provided by one or more virtual serving gateways at one or more physical hosts, such as according to service requirements set forth in the network information.

At 630, after association, the resources of the gateway host candidate corresponding to the virtual serving gateway are updated to reflect the association with the machine, for example to reflect that the machine uses a certain amount of the gateway host candidate's bandwidth.

At 635, the state of the gateway host candidate is updated, for example to reflect whether it still has resources available for association with another machine or whether it no longer has resources available. Where there is freedom to define the functionality(ies) provided by virtual serving gateway(s) at a physical host, the state of the gateway host candidate may also be updated to reflect any newly defined functionality(ies).

625 to 635 may be repeated recursively for all the machines in the clustering hierarchy (or for all the machines in the clusters identified to be relevant to the local region, in the case where the VN topology is generated only for a local region) until all machines have been associated with a virtual serving gateway and the virtual serving gateway(s) have been located at respective physical host(s).

Where a hierarchical topology is permitted (e.g., where at least one gateway candidate is permitted to be at a hierarchy level of two or higher), 625 to 635 may further be carried out by treating a lower level virtual serving gateway as a virtual machine to be associated with a higher level virtual serving gateway. Information about the permitted hierarchical level of gateway host candidates (e.g., as provided in the network information) may be used when locating higher level virtual serving gateways at physical hosts. The recursive method may be used to associate lower level virtual serving gateway(s) with higher level virtual serving gateway(s), resulting in a hierarchical topology.

A hierarchical topology may be generated for the purpose of service-function chaining, for example, as discussed above. A hierarchical topology may also be generated according to the physical topology. For example, a lower level virtual serving gateway may serve as the egress router only for machines in a local city area (e.g., the Ottawa region) and a higher level virtual serving gateway may serve as the egress router for a greater geographical area (e.g., the Ontario provincial network).

In some examples, even where a hierarchical topology is permitted, a hierarchical topology may not be generated or a topology having fewer levels than permitted may be generated. For example, if network traffic is low, it may be preferable to have fewer levels in the topology, in order to improve network performance and/or user experience. In some examples, the VN topology may be generated to include a logical path having fewer levels to route urgent traffic.

In some situations, one or more gateway host candidates may not be associated with any machines or any lower-level virtual serving gateways, in which case those unassociated gateway host candidates will not be included in the VN topology.

At 640, a set of output information defining the VN topology is generated. The output information may be transmitted to an external system, for example to the flow translator 310 of the SDN controller 300. The set of output information defining the VN topology may include, for example:

information locating virtual serving gateway(s) at physical host(s) (e.g., in the form of datasets associating a service identifier with a list of gateway-host identifiers);

information associating machines to virtual serving gateway(s) (e.g., in the form of datasets associating service identifiers, machine identifiers/descriptions, and respective gateway-host identifiers); and/or information about the multi-level VN topology (e.g., in the form of datasets associating service identifiers, first gateway-host identifiers, and respective second gateway-host identifiers) where a hierarchical topology is generated.

Where the VN topology is generated for only a given portion of the network (e.g., only for a local region), the output information may include information only relevant to that given portion of the network. In other examples, the output information may include information for the entire network, even though the VN topology may be changed only for that given portion of the network.

In some examples, where the method 600 also defines functionality(ies) provided by virtual serving gateway(s) at physical host(s), information defining the functionality(ies) to be provided at the physical host(s) may also be outputted. For example, this information may be included with the set of output information at 640, or in a second set of output information. This information may be transmitted to an external system, for example to the SDP system 128.

The example method 600 described above uses clustering techniques and a recursive process to generate the VN topology. In other examples, such as where there are a relatively small number of machines (e.g., less than several hundred), clustering and recursion may not be used. Instead, the VN topology may be generated by simply traversing down a list of machines in the network and performing 625 to 635 for each machine, or by simply solving an optimization problem directly.

Different VN topologies may be generated for different networks (e.g., with overlapping or non-overlapping physical network nodes) and/or for different M2M services within the same network. The virtual serving gateways of different VN topologies (e.g., for different M2M services) may share one or more common physical hosts. In such situations, selection of hosts for the virtual serving gateways may be coordinated across the different VN topologies. For example, the input information for generating a VN topology may include information about host resources that are currently available (i.e., after allocation to one or more other VN topologies).

The VN topology generated by the example method 600 may enable sufficiently thick aggregate data flows to facilitate TE for traffic flowing from each virtual serving gateway. The generated VN topology may enable trunking and/or content compression at virtual serving gateways, for better network resource utilization.

Figure 7:
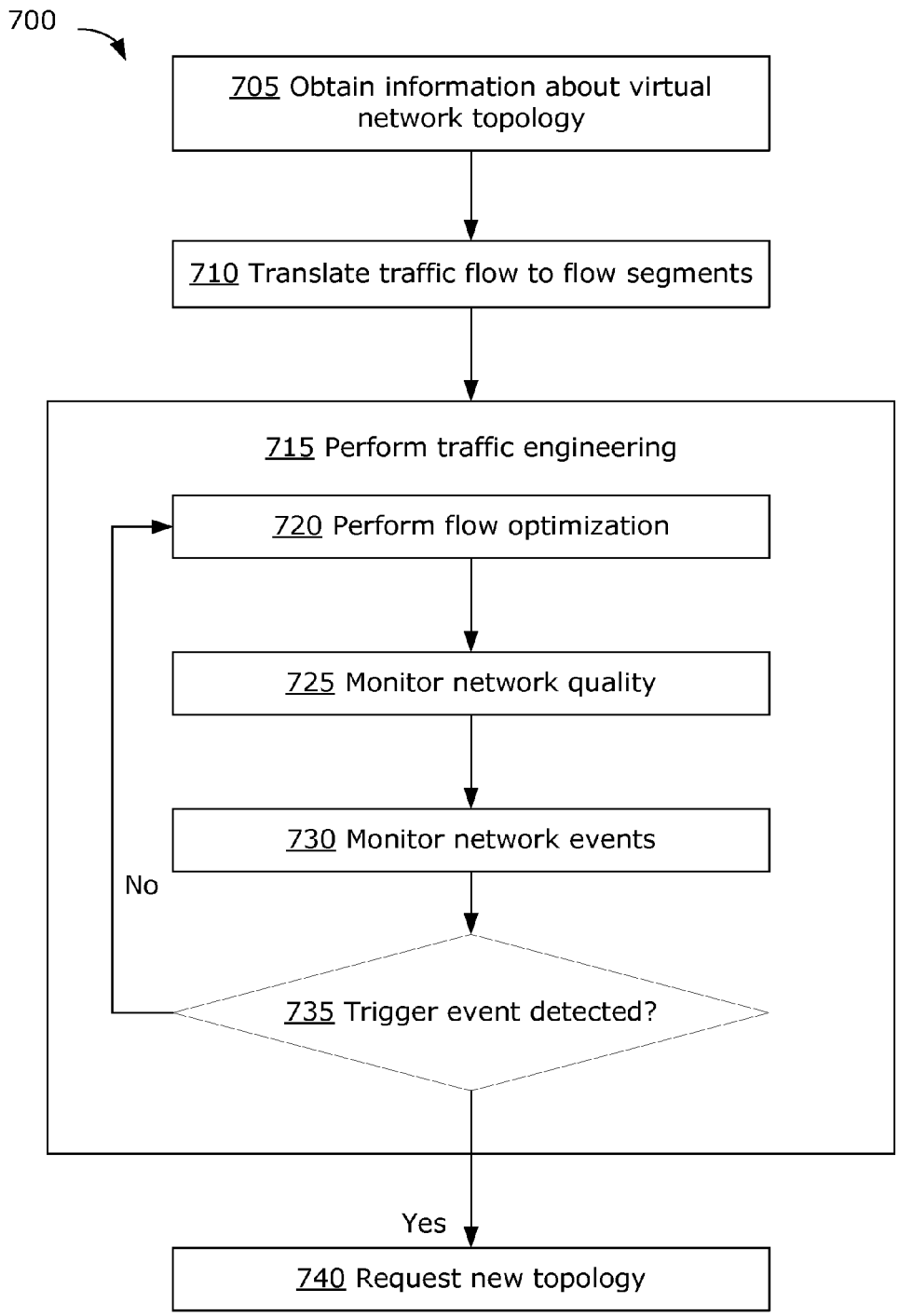
FIG. 7 is a flowchart illustrating an example method for traffic engineering for M2M communications.

FIG. 7 is a flowchart of an example method for TE of M2M traffic, using a VN topology. The example method 700 may be implemented by the SDN controller 300, using one or more suitable processing systems 400.

At 705, information about the VN topology is obtained. This information may be received from the SDT system 200 at the flow translator 310 of the SDN controller 300, or may be retrieved from the VN topology database 305. The VN topology information may include the output information generated by the example method 600 described above. For example, the VN topology information may define a VN topology that identifies locations of virtual serving gateway(s) at physical host(s) and that identifies associations of each machine with one of the virtual serving gateway(s).

At 710, the VN topology information is used to translate raw traffic flow into flow segments. This may be carried out by the flow translator 310. For example, a logical path from a given machine to a first virtual serving gateway, then a second virtual serving gateway, and finally the sink may be translated as three separate flow segments: from the machine to the first virtual serving gateway, from the first virtual serving gateway to the second virtual serving gateway, and from the second virtual serving gateway to the sink. Thus, a hierarchical VN topology may be segmented into flow segments between adjacent levels of the hierarchy. A non-hierarchical topology (i.e., having only a single level of virtual serving gateways) may be translated into a flow segment from the machine to its associated virtual serving gateway, and a flow segment from the virtual serving gateway to the sink.

At 715, TE is performed on the flow segments. For two-phase traffic, TE may be performed separately for the machine-to-gateway flow segment and for the gateway-to-sink flow segment(s). In some examples, TE may be performed for one or both traffic phases (e.g., according to configuration settings). In some examples, it may be possible to dynamically switch (e.g., in response to monitoring of the network) between TE on the machine-to-gateway phase only, TE on the gateway-to-sink phase only, and TE on both phases.

TE may include performing flow optimization at 720 (e.g., performed by the TE module 315) using suitable TE techniques. The method 700 may also include monitoring network quality at 725 (e.g., performed by the quality monitor 320) and monitoring network events at 730 (e.g., performed by the network monitor 325). Monitoring the network quality and monitoring for network events may be carried out in order to detect one or more trigger events to trigger an update to the VN topology. Monitoring the network quality may include monitoring the overall QoE and/or QoS of the network, per service QoE and/or QoS, and/or per service per end-to-end flow QoE and/or QoS. If the quality drops below a predetermined threshold, this may indicate a need to update the topology. Monitoring network events may include detecting significant changes to the physical topology (e.g., additional/removal of more than a threshold number of machines, addition/removal of a physical host for a virtual serving gateway, increase/decrease of machine or background network traffic beyond a predetermined threshold, addition/removal of a physical link in the network, increase/decrease in capacity of a physical link).

At 735, if at least one trigger event is detected (e.g., significant changes in traffic load, network node capabilities, and/or changes in the physical network), the method 700 may generate a request for a new topology at 740. Otherwise, the method 700 may return to 720 and 730 to continue flow optimization and quality monitoring.

The request for a new topology may be transmitted to the SDT system 200, and may serve as a trigger to cause the SDT system 200 to generate a new VN topology, for example as described above. The request for a new topology may include input information to be used for generating the VN topology (e.g., updated network information and/or updated configuration information), and may change or update the input information (e.g., cost measures, permissible hierarchy depth) to reflect dynamic network behavior. For example, if network traffic is currently low, the SDN controller 300 may restrict the VN topology to a hierarchy of three levels or less and update the input information to the SDT system 200 accordingly. The SDN controller 300 may also identify to the SDT system 200 particular gateway-host identifiers that are exhibiting traffic congestion, for example, and update the input information to the SDT system 200 accordingly.

In some examples, the present disclosure provides a method for traffic engineering for machine-to-machine communications, of which FIG. 7 may be an example. The method may include: obtaining topology information defining a virtual network topology for a physical network; segmenting traffic flow into individual flow segments, based on the virtual network topology; performing traffic engineering on the flow segments and monitoring traffic quality in the physical network; and when a trigger event is detected, generating a request for a new virtual network topology.

The example methods 600 and 700 may operate in conjunction, to implement a closed-loop feedback control between the SDT system 200 and the SDN controller 300. This may facilitate an adaptive VN topology that can seamlessly and dynamically adjust to changes in network traffic, changes in gateway functions, and changes in the physical network, for example.

Example Optimization Processes

Example optimization processes that may be used to generate the virtual network topology are now described.

The example processes may be implemented by the SDT system 200 (e.g., at the topology generation module 215), and may be examples of the recursive optimization process for generating the VN topology, as described with respect to FIG. 6. The examples below describe processes for associating machines to virtual serving gateways and locating virtual serving gateways at physical hosts. Although not discussed in detail, similar optimization processes may be used to associate lower level virtual serving gateways to higher level virtual serving gateways, in a hierarchical VN topology.

The optimization problems discussed below may be NP hard mix integer programming problems, which are solved in these examples by relaxation and routing techniques. An online greedy incremental algorithm may be used (e.g., at predefined time intervals) to accommodate dynamic addition and removal of machines in the network.

In the following discussion, the network is modeled with a set of machines M connected to the network G through single-hop connectivity. G includes the set of nodes N and the set of links L. The nature (e.g., wireless or wired) and quality of the connectivity between M and G may be ignored for the purpose of the optimization, since these are not expected to have any direct impact on the optimization problem. The physical locations of individual machines m are known a priori. It is assumed that each m transmits packets of constant size z bits to a pre-defined sink node s within the network G, usually at large time intervals (e.g., on the order of seconds). The sink s may be a network gateway through which an application server is connected, for example.

The packet size z may be modeled as $z=h+b$, where $h=\alpha b$ is the header size and b is the payload size. A subset W of N may be pre-configured to be gateway host candidates, and the sink s may be included in W. A trunking function $f_k(\cdot)$ at parameter k may be built in every gateway host candidate. The function $f_k(\cdot)$ aggregates k packets received from associated machines into a single packet for communication to the sink. As a consequence, rate reduction occurs at gateways, by a factor of $\delta=(\alpha b+kb)/k(\alpha b+b)=(\alpha+k)/(\alpha k+k)$. In the case of $k=1$, no trunking occurs and $\delta=1$. Each gateway host candidate w has a rate upper bound $r_w^-$ for outgoing traffic. This bound may be determined from past experience. Dividing this bound by the rate reduction factor $\delta \geq 0$, the upper bound of incoming rate at w may be represented as $$r_w^+ = \frac{r_w^-}{\delta}.$$

It should be noted that $r_w^+$ is naturally bounded above by the minimum of total capacity of incoming links incidental to w and that of outgoing links.

The traffic of a machine m is directed to an associated virtual serving gateway w, rather than directly to the sink s, through minimum cost routing subject to a given cost measure (e.g., shortest path routing). From the virtual serving gateway w, the traffic is directed to the sink s in an aggregate form following TE optimization decision. The cost of associating m to w may be defined as the routing cost, which is the sum of link cost along the routing path, and denoted by $c_{mw}$.

An example optimization approach is now described. Generation of the virtual network topology may have the joint objectives of association cost minimization (ACM) (i.e., minimizing the average association cost from the viewpoint of network resource utilization) as well as gateway selection minimization (GWSM) (i.e., minimizing the number of gateways used from the operational cost perspective). This presents a joint ACM-GWSM optimization problem. In this example, the following parameters will be used:

M: the set of machines.
N: the set of network nodes.
W: the set of gateway candidates, wherein $W \subseteq N$.
$\alpha$: the objective weighting factor, wherein $0 \leq \alpha \leq 1$.
$c_{mw}$: the cost of associating m to w, wherein $m \in M$, $w \in W$.
$r_m$: the traffic rate of m.
$r_w^+$: the incoming rate upper bound at w.
$a_{mw}$: binary decision of associating m to w.
$b_w$: binary decision of selecting to use w.

In an example implementation, M, N, W, $r_m$ and $r_w^+$ may be determined from network information inputted to the topology generation module 215, while constraints and costs for the optimization problem may be formulated in accordance with configuration information inputted to the topology generation module 215.

The average per machine associate cost may be represented as:

$$C(a) = \frac{1}{|M|} \sum_{w \in W} \sum_{m \in M} a_{mw} c_{mw}$$

The total number of gateways selected may be represented as:

$$Z(b) = \sum_{w \in W} b_w$$

The joint ACM-GWSM problem may be solved using multi-objective optimization by linear scalarization, which may be formulated as:

$$\min_{a_{mw}, b_w} \alpha C(a) + (1-\alpha) Z(b) \quad (1)$$

such that:

$$\sum_{w \in W} a_{mw} = 1, \quad (2)$$
$$\forall m \in M$$

$$\sum_{m \in M} a_{mw} r_m \leq r_w^+, \quad (3)$$
$$\forall w \in W$$

$$a_{mw} \in \{0, 1\}, \quad (4)$$
$$\forall m \in M,$$
$$\forall w \in W$$

$$a_{mw} \leq b_w, \quad (5)$$
$$\forall m \in M,$$
$$\forall w \in W$$

An example heuristic for solving this ACM-GWSM problem is outlined below. Other approaches may be suitable. To avoid an intractable problem, the following example takes a relaxed ACM approach instead. In this approach, the ACM and GWSM objectives are separated. In each iteration, an ACM problem is solved and the gateway candidate set is reduced. The process may end if there is gateway overloading, if the solution quality decreases and no gateway underloading occurs, or if further set reduction cannot be found. The example heuristic is outlined using pseudo-code below:

| Require: W |  |
|---|---|
| 1: W' → W | ▷ Set of GWs in consideration |
| 2: U → ∅ | ▷ Set of GWs not in consideration |
| 3: S → null | ▷ last solution |
| 4: q → ∞ | ▷ Quality of last solution |
| 5: while true do | |
| 6:     S' → SOLVEPROBLEM2(W') | |
| 7:     q' → EVALUATE(S') | |
| 8:     if OVERLOADED(S') then | |
| 9:         break | |
| 10:    else if q' > q and !UNDERLOADED(S') then | |
| 11:        break | |
| 12:    end if | |
| 13:    S → S' | |
| 14:    q → q' | |
| 15:    ($w_1$, $w_2$, $w_3$) → GFTSETREDUCTION(S, U) | |
| 16:    if ($w_1$, $w_2$, $w_3$) = null then | |
| 17:        break | |
| 18:    end if | |
| 19:    W' → W' \ {$w_1$, $w_2$}, U → U ∪ {$w_1$, $w_2$} | |
| 20:    W' → W' ∪ {$w_3$}, U → U \ {$w_3$} | |
| 21: end while | |
| 22: return S | |

The example ACM-GWSM heuristic solves a relaxed ACM problem in each iteration, based on an iteratively updated gateway candidate set W. In this example, line 7 evaluates the objective function defined in (1) above; lines 8 and 10 evaluate the load of each virtual serving gateway according to the constraint defined in (3) above; and line 15 identifies a best virtual serving gateway candidate $w_3$ such that associating the machines currently associated to virtual serving gateway candidates $w_1$ and $w_2$ to $w_3$ instead leads to the largest solution quality improvement (i.e., greatest decrease of value of q). The relaxed ACM problem solved in line 6 may be represented as:

$$\min_a \alpha C(a) + \mathcal{M} V(a)$$

such that:

$$\sum_{w \in W} a_{mw} = 1,$$

$$\forall m \in M$$

$$a_{mw} \in \{0, 1\},$$

$$\forall m \in M, \forall w \in W$$

Here, V(a) is the maximum violation of constraint (3), and $\mathcal{M}$ is a very large positive value such that any violation will offset the profit of association cost minimization. Use of this soft constraint is to ensure feasibility.

In some examples, the VN topology may be generated to take advantage of the tendency for M2M traffic to have correlated traffic content. For example, a local group of machines may tend to respond to the same local event or query, resulting in an increased instantaneous rate of traffic (e.g., more packets are transmitted in a short time slot than usual). The correlated rate increase may imply correlated traffic content. Content compression may be applied to M2M traffic to save network resources, such as bandwidth and energy. Aggregation of content-correlated traffic at a common virtual serving gateway may achieve better content compression and greater increase in efficiency.

The machine-to-gateway association problem, taking into account traffic correlation, may be formulated as an optimization problem with three objectives: the ACM and GWSM objectives, as in the example above, and additionally correlation distance minimization (CDM) (i.e., minimization of total correlation distance between machines associated to the same gateway, in order to maximum content aggregation potential). This three-objective problem will be referred to as the joint ACM-GWSM-CDM optimization problem.

The traffic rate correlation between two machines m and m' over a time slot t may be denoted as $\phi_{mm'}^t$. An example model is now described to calculate this correlation. In this example, time is divided into slots of equal length, and each slot is further split evenly into a number p of frames. For each machine m, the average traffic rate $r_i^t(m)$ is sampled in every time frame i of each time slot t. The samples form a time series $r^t(m) = \{r_i^t(m) | i=1, \ldots, p\}$ for every t. The mean of the sample set $r^t(m)$ may be denoted as $\bar{r}^t(m)$. The traffic rate correlation $\phi_{mm'}^t$ between machines m and m' in time slot t may be calculated using Pearson's Correlation of the two sample sets $r^t(m)$ and $r^t(m')$ as follows:

$$\phi_{mm'}^t = \frac{\sum_{i=1}^{p}(r_i^t(m) - \bar{r}^t(m))(r_i^t(m') - \bar{r}^t(m'))}{\sqrt{\sum_{t=1}^{p}(r_i^t(m) - \bar{r}^t(m))^2} \sqrt{\sum_{t=1}^{p}(r_i^t(m') - \bar{r}^t(m'))^2}}$$

The correlation $\phi_{mm'}^t$ has a real value between −1 and 1, inclusive. A positive value indicates that relatively high (or low) scores on one variable are mapped to relatively high (or low) scores on the other variable. Conversely, a negative value indicates that relatively high (or low) scores on one variable are mapped to relatively low (or high) scores on the other variable. Thus, a correlation distance between m and m' may be defined as:

$$d_{mm'} = 1 - \hat{\phi}_{mm'}$$

where $\hat{\phi}_{mm'}$ denotes the expected correlation value in the most recent q time slots. $d_{mm'}$ has a value in the range [0,2]. The smaller the value, the more likely the traffic content of m and m' is correlated. It should be noted that $d_{mm'} = d_{m'm}$, and $d_{mm} = 0$.

The traffic rate $r_m$ of machine m may be calculated as the expected rate in the most recent q time slots.

In the example joint ACM-GWSM-CDM problem, the following parameters will be used:

M: the set of machines.
N: the set of network nodes.
W: the set of gateway candidates, wherein $W \subseteq N$.
δ: the traffic rate reduction factor at w, wherein w ∈ W.
$c_{mw}$: the cost of associating m to w, wherein m ∈ M.
$d_{mm'}$: the correlation distance of m and m'.
$r_m$: the traffic rate of m.
$r^+_w$: the incoming rate upper bound at w.
$a_{mw}$: binary decision of associating m to w.
$b_w$: binary decision of selecting to use w.
$g^w_{mm'}$: binary indicator of m, m' both associated to w.

The average per machine associate cost may be represented as:

$$C(a) = \frac{1}{|M|} \sum_{w \in W} \sum_{m \in M} a_{mw} c_{mw}$$

The total number of gateways selected may be represented as:

$$Z(b) = \sum_{w \in W} b_w$$

The total intra-association M2M correlation distance may be represented as:

$$R(g) = \frac{1}{2} \sum_{w \in W} \sum_{m,m' \in M} g_{mm'}^w \cdot d_{mm'}$$

The joint ACM-GWSM-CDM problem may be solved using multi-objective optimization by linear scalarization, which may be formulated as:

$$\min_{a,b,g,v} \alpha C(a) + \beta Z(b) + \gamma R(g) + \mathcal{M} v \quad (6)$$

such that:

$$\sum_{w \in W} = 1,$$
$$\forall m \in M$$

$$a_{mw} \leq b_w, \quad (7)$$
$$\forall m \in M,$$
$$\forall w \in W$$

$$a_{mw} + a_{m'w} - g_{mm'}^w \leq 1, \quad (8)$$
$$\forall m, m' \in M,$$
$$\forall w \in W$$

$$-a_{mw} - a_{m'w} + 2g_{mm'}^w \leq 0, \quad (9)$$
$$\forall m, m' \in M,$$
$$\forall w \in W$$

$$\sum_{m=M} a_{mw} r_m - r_w^+ \leq v, \quad (10)$$
$$\forall w \in W$$

$$a_{mw} \in \{0, 1\}, \quad (11)$$
$$\forall m \in M,$$
$$\forall w \in W$$

$$g_{mm'}^w \in \{0, 1\}, \quad (12)$$
$$\forall m,$$
$$m' \in M,$$
$$\forall w \in W$$

$$v \geq 0 \quad (13)$$

In this example ACM-GWSM-CDM formulation, $a_{mw}$, $b_w$ and $g_{mm'}^w$ are decision variables; and $\alpha, \beta, \gamma \in [0,1]$ are objective weighting factors that satisfy $\alpha + \beta\gamma = 1$.

Constraint (6) ensures that each machine is associated to exactly one gateway candidate. Constraint (7) and the minimization objective together ensure that $b_w$ is equal to $\max_m a_{mw}$. Since $a_{mw}$ has a binary value, $b_w$ represents whether w is used or not at solution. Constraints (8) and (9), together with the minimization objective, force $g_{mm'}^w$ to equal $a_{mw} a_{m'w}$ at solution, and thus represent the co-association of m, m' to w in solution. The term $\mathcal{M} v$ in the objective function is a penalization term. Under the minimization objective, constraints (10) and (13) ensure that the artificial variable v takes a value equal to the maximum incoming rate violation at solution. If there is no violation, then v will have a zero value. As $\mathcal{M}$ has a very large positive value, the problem favors a solution that generates zero or minimal incoming rate violations at gateways. Using this soft incoming rate control, rather than a hard constraint, may help to ensure feasibility and the best possible solution is obtained.

This example formulation presents an NP-hard mix integer programming problem, which may be solved in two steps. At the first step, it can be relaxed to a linear programming problem and the relaxed problem may be solved to obtain a fractional solution. At the second step, the fractional solution may be rounded in an iterative way, for example as follows. The integral decisions are first fixed and the machines for which the decisions are fractional are sorted. The set of such machines may be denoted by M'. The sorting is then done in descending order of $a_{mw}$, $\forall m \in M'$, $\forall w$. The machines in M' are processed according to this ordering. When processing a machine m, all $a_{mw}$, $\forall m' \in M$, $m' \neq m$, $\forall w$ are treated as a constant variable and the ACM-GWSM-CDM problem is solved optimally. The decisions are then taken as the final decision for m.

For both the ACM-GWSM example problem and the ACM-GWSM-CDM example problem, scalability may be a concern. Typically, gateway candidates (i.e., W) are predetermined by the network operation and normally fixed. The size of the problem then depends on the number of machines (i.e., |M|), which is typically dynamic and dependent on the customer (e.g., the M2M service provider). When |M| is a very large number (e.g., in the range of several hundred or greater), the optimization may take a long time to converge. This computational delay may not be acceptable where quick reaction to network dynamics is desirable. To address this, a divide-and-conquer approach may be used for scalability.

For example, traffic density may be used as the basis for a divide-and-conquer approach. In this example, R represents the overall traffic density in the network. Per machine traffic density can be normalized as:

$$d_m = \frac{r_m}{R},$$
$$\forall m \in M.$$

Apparently, $d_m \in [0,1]$. Considering the ACM objective, gateway candidates in or near traffic-dense regions may be favored. Machines are clustered according to traffic density to create a clustering hierarchy. Suitable techniques for creating a density-based clustering hierarchy include approaches such as density-based spatial clustering of applications with noise (DBSCAN) and ordering points to identify the clustering structure (OPTICS). Then, the optimization problem (e.g., ACM-GWSM or ACM-GWSM-CDM problem) is solved inside each cluster, traversing the clustering hierarchy from the bottom (greater traffic density) to the top (lesser traffic density). By proceeding from the bottom to the top, denser regions are processed first. In other examples, the clustering hierarchy may be traversed from the top to the bottom. Clusters at the same level within the hierarchy may be processed in any order. After each cluster is processed, the capabilities of the gateway candidates (e.g., the traffic load bounds) are updated before moving to process the next cluster. Such an approach may enable the optimization problem to be solved even where the number of machines is large (e.g., a few thousand machines or more).

This technique may be used in the recursive optimization process described in example method 600 above.

This approach may be extended to cases where the number of gateway host candidates is very large (e.g., in the range of a few hundred or more). In the extended approach, the clustering hierarchy is built and traversed from the bottom to the top, as described above. At each cluster, the machines within the cluster are merged into a single sub-graph. This process may bring into the sub-graph machines that are not in the cluster. These extra machines may be included to ensure the connectivity of the sub-graph. In some examples, this process may be performed by growing a disc around each machine in the cluster. As the discs grow, the number of machines covered by the discs increases. When all these machines are connected (e.g., via routers covered by the discs), the process stops and a connected sub-graph is obtained. Other suitable methods may be used.

The sub-graph is then recursively simplified by removing terminal routers, which are routers within the sub-graph but not serving any machines in the sub-graph. The routers remaining in the sub-graph may then be used as gateway host candidates and the optimization problem (e.g., ACM-GWSM or ACM-GWSM-CDM problem) is solved inside the cluster. Using the sample solution from this cluster, a subset of gateway host candidates can be determined by determining those candidates that fit into the sample solution with minimum mean square error (MSE). In some examples, the optimization problem may be further solved for this subset to obtain a final solution.

The present disclosure provides certain example algorithms and calculations for implementing examples of the disclosed methods and systems. However, the present disclosure is not bound by any particular algorithm or calculation.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for generating a virtual network topology for machine-to-machine communications, the method comprising:
   receiving a trigger signal indicating a request for generation of a new virtual network topology; and
   in response to receipt of the trigger signal:
      obtaining a set of input information, the input information including:
         network information providing information about a physical network for machine-to-machine communications among a plurality of machines; and
         configuration information providing one or more parameters for configuring the virtual network topology;
      locating one or more virtual serving gateways for the virtual network at one or more physical hosts in the physical network and associating each of the plurality of machines with one of the one or more virtual serving gateways, in accordance with the network information and the configuration information; and
      generating a set of output information defining the virtual network topology, the output information including:
         information identifying a location of the one or more virtual serving gateways at the one or more physical hosts; and
         information identifying associations between the plurality of machines and the one or more virtual serving gateways.

2. The method of claim 1 wherein associating each of the plurality of machines with the one virtual serving gateway comprises matching one or more resource requirements of each machine with corresponding one or more available resources of the physical host of the one virtual serving gateway, the one or more resource requirements of each machine and the one or more available resources of the physical host being determined in accordance with at least one of the network information and the configuration information.

3. The method of claim 1 wherein the configuration information defines a permissible hierarchy of two or more levels for the virtual network topology, the method further comprising:
   associating at least one lower level virtual serving gateway with at least one higher level virtual serving gateway, in accordance with the network information and the configuration information; and
   wherein the set of output information includes information identifying an association between the at least one lower level virtual serving gateway and the at least one higher level virtual serving gateway.

4. The method of claim 3 wherein the at least one lower level virtual serving gateway is located at a first physical host providing a first set of services, wherein the at least one higher level virtual serving gateway is located at a second physical host providing a second set of services, and wherein at least one service from each of the first and second sets of services are required by at least one machine associated with the at least one lower level virtual serving gateway.

5. The method of claim 1, further comprising:
determining one or more functionalities to be provided by at least one virtual serving gateway located at the one or more physical hosts;
generating a second set of output information defining the one or more functionalities to be provided by the one or more physical hosts; and
transmitting the second set of output information to a software-defined protocol system.

6. The method of claim 1 wherein the set of input information indicates a new virtual network topology is to be generated only for a portion of the physical network, and wherein the locating and associating is performed only for the one or more physical hosts and the machines corresponding to the portion of the physical network.

7. The method of claim 1 wherein a recursive optimization process is used for locating the one or more virtual serving gateways at the one or more physical host and associating each of the plurality of machines with the respective virtual serving gateway.

8. The method of claim 7 wherein the recursive optimization process comprises:
dividing the plurality of machines into a clustering hierarchy based on machine traffic; and
performing the locating and associating within each cluster of the clustering hierarchy, by traversing the clustering hierarchy from bottom to top or top to bottom.

9. The method of claim 8 wherein the set of input information indicates a new virtual network topology is to be generated only for a portion of the physical network, and wherein the locating and associating is performed only for one or more clusters of the clustering hierarchy corresponding to the portion of the physical network.

10. The method of claim 7 wherein the recursive optimization process solves a joint optimization problem that jointly defines a first optimization objective with respect to network resource utilization and a second optimization objective with respect to number of virtual serving gateways.

11. The method of claim 10 wherein the network information includes information for calculating a correlation of traffic content between machines, wherein the joint optimization problem further jointly defines a third optimization objective with respect to content correlation between machines associated with the same virtual serving gateway.

12. The method of claim 1 wherein the trigger signal is received from a software-defined networking controller, and the trigger signal comprises an update to the input information.

13. The method of claim 1 further comprising transmitting the set of output information to a software-defined networking controller.

14. A method for traffic engineering for machine-to-machine communications among a plurality of machines, the method comprising:
receiving, from a software-defined topology system, topology information defining a virtual network topology for a physical network, the virtual network topology identifying locations of one or more virtual serving gateways at one or more physical hosts in the physical network and identifying associations of each of the plurality of machines with one of the one or more virtual serving gateways;
segmenting traffic flow into individual flow segments, based on the virtual network topology;
performing traffic engineering on the flow segments and monitoring traffic quality in the physical network;
when a trigger event is detected, generating a request for a new virtual network topology; and
transmitting the request for a new virtual network topology to the software-defined topology system.

15. The method of claim 14 wherein the trigger event comprises one or more of:
traffic quality falling below a predetermined quality threshold;
addition or removal of a physical node in the physical network;
addition or removal of a physical link in the physical network;
increase or decrease in capacity of a physical link in the physical network;
addition or removal of a number of machines in the physical network beyond a predetermined threshold;
increase or decrease in machine traffic beyond a predetermined threshold; or
increase or decrease of background network traffic beyond a predetermined threshold.

16. The method of claim 14 wherein the topology information defines a hierarchical topology for the virtual network topology, and segmenting the virtual network topology comprises translating a flow path through two or more hierarchical levels into corresponding two or more flow segments between adjacent hierarchical levels.

17. A system for generating a virtual network topology for machine-to-machine communications, the system comprising a processing device configured to cause the system to:
receive a trigger signal from a software-defined networking controller, the trigger signal indicating a request for generation of a new virtual network topology;
in response to receipt of the trigger signal:
obtain a set of input information, the input information including:
network information providing information about a physical network for machine-to-machine communications among a plurality of machines; and
configuration information providing one or more parameters for configuring the virtual network topology;
locate one or more virtual serving gateways for the virtual network at one or more physical hosts in the physical network and associate each of the plurality of machines with one of the one or more virtual serving gateways, in accordance with the network information and the configuration information;
generate a set of output information defining the virtual network topology, the output information including:
information identifying a location of the one or more virtual serving gateways at the one or more physical hosts; and
information identifying associations between the plurality of machines and the one or more virtual serving gateways; and
transmit the set of output information to the software-defined networking controller.

18. The system of claim 17 wherein the processing device is further configured to cause the system to associate each of the plurality of machines with the one virtual gateway by matching one or more resource requirements of each machine with corresponding one or more available resources of the physical host of the one virtual gateway, the one or more resource requirements of each machine and the one or more available resources of the physical host being determined in accordance with at least one of the network information and the configuration information.

19. The system of claim 17 wherein the configuration information defines a permissible hierarchy of two or more levels for the virtual network topology, the processing device being further configured to cause the system to:
  associate at least one lower level virtual gateway with at least one higher level virtual gateway, in accordance with the network information and the configuration information; and
  wherein the set of output information includes information identifying an association between the at least one lower level virtual gateway and the at least one higher level virtual gateway.

20. The system of claim 17 wherein the processing device is further configured to cause the system to perform a recursive optimization process to locate the one or more virtual gateways at the one or more physical host and to associate each of the plurality of machines with the respective virtual gateway, the recursive optimization process involving:
  dividing the plurality of machines into a clustering hierarchy based on machine traffic; and
  performing the locating and associating within each cluster of the clustering hierarchy, by traversing the clustering hierarchy from bottom to top.

21. The system of claim 17 wherein the processing device is further configured to cause the system to:
  determine one or more functionalities to be provided by at least one virtual serving gateway located at the one or more physical hosts;
  generate a second set of output information defining the one or more functionalities to be provided by the one or more physical hosts; and
  transmit the second set of output information to a software-defined protocol system.

22. A system for traffic engineering for machine-to-machine communications among a plurality of machines, the system comprising a processing device configured to cause the system to:
  receive, from a software-defined topology system, topology information defining a virtual network topology for a physical network, the virtual network topology identifying locations of one or more virtual serving gateways at one or more physical hosts in the physical network and identifying associations of each of the plurality of machines with one of the one or more virtual serving gateways;
  segment traffic flow into individual flow segments, based on the virtual network topology;
  perform traffic engineering on the flow segments and monitoring traffic quality in the physical network;
  when a trigger event is detected, generate a request for a new virtual network topology; and
  transmit the request for a new virtual network topology to the software-defined topology system.

23. The system of claim 22 wherein the topology information defines a hierarchical topology for the virtual network topology, and the processing device is further configured to cause the system to segment the virtual network topology by translating a flow path through two or more hierarchical levels into corresponding two or more flow segments between adjacent hierarchical levels.

* * * * *